(12) United States Patent
Otagiri et al.

(10) Patent No.: US 6,376,108 B1
(45) Date of Patent: Apr. 23, 2002

(54) MAGNETIC MATERIAL AND MAGNETIC HEAD USING THE SAME AND MAGNETIC STORAGE DEVICE HAVING THEREOF

(75) Inventors: Mitsuru Otagiri, Zama; Sanae Takefusa, Isehara; Yuko Miyake, Yamato, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,064

(22) Filed: Dec. 14, 1999

(30) Foreign Application Priority Data

Dec. 14, 1998 (JP) .......................... 10-354305
Oct. 29, 1999 (JP) .......................... 11-308827

(51) Int. Cl.⁷ .............................. G11B 5/66
(52) U.S. Cl. .............. 428/692; 428/694 R; 428/694 T; 428/900; 360/113; 324/252
(58) Field of Search ................ 428/634 R, 634 T, 428/692, 900; 360/113; 324/252

(56) References Cited

U.S. PATENT DOCUMENTS 5,750,251 A * 5/1998 Ohji ........................... 428/332
6,120,919 A * 9/2000 Shigemotsu ................ 428/692
6,150,046 A * 11/2000 Watanabe ............... 428/694 R

* cited by examiner

Primary Examiner—Leszek Kiliman
(74) Attorney, Agent, or Firm—Greer, Burns & Crain, Ltd.

(57) ABSTRACT

This invention is to provide a magnetic head consisting of NiFeMo alloy which assures excellent high frequency characteristic and makes easy formation of magnetic domain structure without any heat treatment and thereby contributes to improvement of magnetic recording capability. Magnetic material for a magnetic head includes Ni, Fe and Mo. The composition ratio of NiFeMo is selected under the condition where Ni is 77 to 82 atom %, Fe is 15 to 21 atom %, Mo is under 6 atom %, and magnetic strain constant $\lambda s$ is in the range of $-1 \times 10^{-6} \leq \lambda s \leq 10^{-6}$.

24 Claims, 6 Drawing Sheets

DIRECTION OF UNISOTROPY

Fig. 9A

$\lambda > 0$ (50NiFe etc.)

(y>x, $\lambda$>0, $\sigma$>0)

Fig. 9B

MATERIAL: 82NiFe ($\lambda$<0)

(x>y, $\lambda$>0, $\sigma$>0)

Fig. 10

MATERIAL: 50NiFe ($\lambda$>0)

(xl>yl, $\lambda$>0, $\sigma$>0)

MAGNETIC MATERIAL AND MAGNETIC HEAD USING THE SAME AND MAGNETIC STORAGE DEVICE HAVING THEREOF

CROSS-REFERENCE TO RELATED APPLICATIONS

This application is based upon and claims priority of Japanese Patent Applications Nos. Hei 10-354305 and Hei 11-308827, filed, the contents being incorporated herein by reference.

BACKGROUND OF THE INVENTION a) Field of the Invention

The present invention relates to a magnetic material, magnetic head and magnetic storage device and particularly to a magnetic material, magnetic head and magnetic storage device having the characteristic for composition to improve high frequency characteristic of induction type head and MR head forming a composite type thin film magnetic head to be used in the magnetic storage device such as a Hard Disk Drive (HDD) or magnetic tape device.

b) Description of the Related Art

Because of growing of request in these years for reduction in size and expansion of capacity of a hard disk drive as an external storage device of computer, the recording frequency is reaching 100 MHz ($10^8$ Hz). In such magnetic storage device, the magnetic heads for writing and reading recording data are always integrally structured in such a manner that the write head for recording and the read head for reproducing are individually arranged. Namely, these heads are sequentially laminated as the layers in a series of filming process so that the recording head and reading heads are accurately arranged adjacently with less positional deviation in the narrow pitch for the write and read operation of magnetic recording medium in order to realize high density recording.

The upper magnetic pole layer of such a thin film magnetic head is often formed using a permalloy alloy such as $Ni_{82}Fe_{18}$ or the like which has been integrally formed by the mask plating method. Here, however, an example of the composite type thin film magnetic head of the related art will be explained with reference to FIG. 6.

Figure 6:
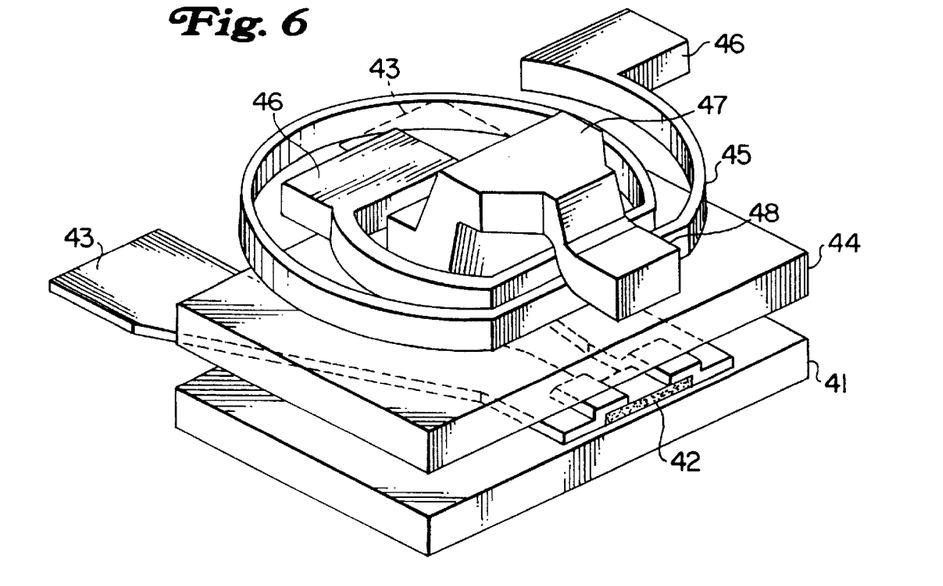
FIG. 6 is a perspective view of the essential portion of a composite type thin film magnetic head of the related art.

FIG. 6 is a schematic perspective view of the essential portion of a composite type thin film magnetic head of the related art. A lower shield layer 41 consisting of NiFe alloy or the like is provided, through the $Al_2O_3$ film (not illustrated), on the $Al_2O_3$-TiC substrate (not illustrated) as the mother material of slider, a magnetic resistance effect element 42 consisting of a laminated structure, etc. of NiFe, Ti, NiFeCr is provided via a lower lead gap layer (not illustrated) such as $Al_2O_3$ or the like, these are then patterned in the predetermined shape and thereafter a read electrode 43 is formed by depositing a conductive film consisting of Au, etc. to both ends of the magnetic resistance effect element 42.

Next, a lower magnetic pole layer 44, which also works as the upper shield layer, consisting of NiFe alloy or the like is provided again via the upper lead gap layer (not illustrated) such as $Al_2O_3$ or the like and a write gap layer (not illustrated) consisting of $Al_2O_3$ or the like is provided thereon, a horizontal spiral type write coil 45 is formed via a lower inter-layer insulating film (not illustrated) such as resist, etc., a write electrode 46 is provided to both ends of such coil, and thereafter an upper magnetic pole layer 47 in such a shape as providing a narrow write pole 48 at the end part is provided via the upper interlayer insulating film (not illustrated) consisting of resist, etc.

Next, after the $Al_2O_3$ film is provided to the entire surface as a protection film (not illustrated), a substrate is cut, and machining and slider process including the grinding are performed for adjusting the length of write pole 48, namely the depth of gap. Thereby, a composite type thin film magnetic head in which the MR head for reproducing, namely for reading and an induction type thin film magnetic head for recording, namely for writing utilizing the magnetic resistance effect element 42 can be obtained.

In this case, a magnetic flux generated when a signal current flows into the write coil 44 from a write electrode 46 is guided to a magnetic pole core consisting of the lower magnetic pole layer 44 and upper magnetic pole layer 47, the magnetic flux leaks to the outside by the recording gap formed by the write gap layer at the area near the write pole 48 at the end part of the upper magnetic pole layer 47 and thereby signal is recorded to a recording medium. Moreover, on the contrary, the signal can also be reproduced by detecting the magnetic flux from the recording medium with the magnetic pole core, width of the write pole 48 at the end of the upper magnetic pole layer 47 becomes the track width and the surface recording density can be restricted by this track width.

On the other hand, the reproducing principle of the MR head utilizes the phenomenon that when a constant sense current flows from a read electrode 43, electrical resistance of magnetic thin film forming the magnetic resistance effect element 42 changes depending on the magnetic field from the recording medium.

However, there is a problem that the shield effect for magnetic field noise and drive magnetic field in the frequency of 10 MHz to several tens of MHz and magnetic recording capability in the magnetic shield and upper and lower magnetic pole layers in a composite type thin film magnetic head are largely lowered due to an eddy current loss and thereby recording defect may easily be generated. This problem may be generated because when the frequency becomes higher, an eddy current loss also increases and recording magnetic field intensity is lowered by the surface effect. In order to control such eddy current loss, it is enough that the specific resistance ρ is raised because the eddy current loss is inversely proportional to the specific resistance ρ.

Namely, when a radius of magnetic thin film, namely thickness is τ [m], frequency is f [MHz], intensity of magnetization is Bm[Wb/m²] and specific resistance is ρ [Ω·m], an eddy current loss We per unit volume flowing a magnetic material when a coil is wound around the column type magnetic material of radius 5[m] and a coil current is impressed thereto can be expressed as follow.

$$We = \pi^2 \cdot \tau^2 \cdot f^2 \cdot Bm^2 / 4\rho \tag{1}$$

Therefore, when the specific resistance ρ is large or when radius τ is small, an eddy current loss We becomes small.

Moreover, when specific resistance ρ, thickness of magnetic film is τ, vacuum permeability is μo and permeability of magnetic film is μd, the limit frequency fg is expressed as follow.

$$fg = 4\rho / (\pi \cdot \mu o \cdot \mu d \cdot t^2) \tag{2}$$

Therefore, when the specific resistance ρ is large or thickness t is small, the limit frequency fg becomes large.

However, since the upper magnetic pole layer 47 and write pole 48 in the related art are themselves formed of permalloy such as $Ni_{82}Fe_{18}$ or the like, the specific resistance ρ is as small as about 20 μΩcm and moreover since it is integrally formed of comparatively thick film by the plating, here rises a problem that values of τ or t become large, eddy current loss We unnecessarily becomes large and thereby the limit frequency fg unnecessarily becomes small.

On the other hand, when thickness t of magnetic film is set to a small value, eddy current loss We can be made small and the limit frequency fg can be made large. However, in this case, another problem that total magnetic flux becomes small is also generated.

In view of solving such problems, development is now being continued to attain the material having higher ρ than that of permalloy such as $Ni_{82}Fe_{18}$ or the like. For example, it has been proposed to use, as the high frequency magnetic pole material, the NiFeMo alloy film having the magnetic characteristic almost identical to that of permalloy and specific resistance ρ ($\geq 20$ μΩcm) (if necessary, refer to Japanese Published Unexamined Patent Application No.: HEI 9-63016).

SUMMARY OF THE INVENTION

In the above, the NiFeMo alloy film proposed as the magnetic strain λs as large as exceeding $5 \times 10^{-6}$ and moreover requires the heat treatment in the temperature range of 180° C. to 300° C. for magnetic domain control. In this case, this heat treatment results in a problem that adverse effect will probably be applied on the magnetic resistance effect element forming the reproducing means formed before formation of the magnetic pole.

Namely, the magnetic stra1in λs must be small in order to obtain higher permeability of the magnetic pole layer of a thin film magnetic head (if necessary, refer to "Magnetic Recording Engineering" by Matsumoto, et. al., p-179, Kyoritsu Publication) Moreover, the magnetic flux can be propagated through spin rotation in the hexagonal magnetic domain and reciprocal magnetization process having excellent high frequency response may be generated by conducting magnetic domain control to form the hexagonal magnetic domain up to the area near the end part of the magnetic pole, namely up to the area near the write pole.

Here, the upper magnetic pole layer of an ordinary shape of the related art is considered and ideal magnetic domain structure in the upper magnetic pole layer will be explained with reference to FIG. 7.

Figure 7:
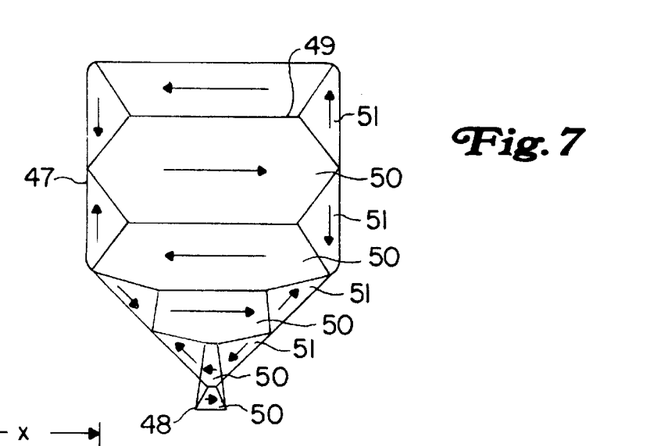
FIG. 7 is a schematic plan view of the ideal magnetic domain structure in relation to the first embodiment of the present invention.

FIG. 7 is a plan view of the upper magnetic pole layer 47. As the ideal magnetic domain structure, it is expected that the hexagonal magnetic domain 50 which will become the main magnetic domain is formed up to the area near the write pole 48 and the magnetizing direction is circulated as indicated by the arrow mark through the triangular magnetic domain 51 which becomes the circulating magnetic domain formed adjacently to the hexagonal magnetic domain 50.

As explained above, there are three important factors of high specific resistance, small magnetic strain constant λs and magnetic domain control and moreover it is also essential to eliminate the process such as heat treatment which gives adverse effect to the magnetic resistance effect element or the like forming the reproducing means formed before formation of magnetic pole.

Accordingly, it is an object of the present invention to improve high frequency characteristic and to form excellent magnetic domain structure without introducing the heat treatment by controlling the composition ratio of NiFeMo in the magnetic material, magnetic head or magnetic storage device.

Figure 1:
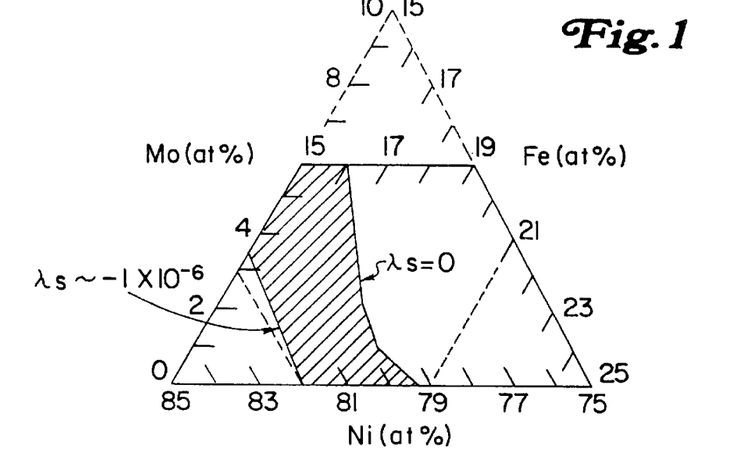
FIG. 1 is a diagram for explaining the principle structure of the present invention.

FIG. 1 is a diagram for explaining principle structure of the present invention and a means for solving the problem in the present invention will be explained with reference to FIG. 1.

FIG. 1 is a composition diagram indicating the preferable range of NiFeMo composition.

The present invention is characterized in that (1) in a magnetic material consisting of Ni, Fe and Mo, the composition ratio of NiFeMo is selected under the condition where Ni is 77 to 82 atom %, Fe is 15 to 21 atom %, Mo is under 6 atom %, and magnetic strain constant λs is in the range of $-1 \times 10^{-6} \leq \lambda s \leq 0$;

(2) In a magnetic material consisting of Ni, Fe and Mo, the composition ratio of NiFeMo is selected under the condition that Ni is 77 to 82 atom %, Fe is 15 to 21 atom %, Mo is under 6 atom % and magnetic strain constant λs is in the range of $0 \leq \lambda s \leq 1 \times 10^{-6}$.

In above items, the magnetic material selected under the condition of item (1) is preferable as the magnetic pole layer of an ordinary write head in the shape having compressed stress. Meanwhile, the magnetic material selected under the condition of item (2) is preferable as the magnetic pole material of write head in the shape having tensile stress.

A high permeability magnetic material having excellent high frequency characteristic can be obtained by controlling the composition ratio of NiFeMo to satisfy the above conditions and moreover when the upper magnetic pole layer is structured by a magnetic material film of such composition ratio, the magnetic domain structure identical to the ideal structure in which the hexagonal magnetic domain is formed up to the area near the end part of the upper magnetic pole layer can be obtained, for example, in regard to the magnetic material under the condition of item (1).

(3) Moreover, the present invention is also characterized in that the composition ratio of NiFeMo is selected so that the coercive force Hc of said magnetic material is in the range of Hc $\leq 1$ Oe in the items (1), (2).

As explained above, excellent soft magnetic characteristic similar to that of permalloy required for magnetic pole layer can be obtained by selecting the composition ratio of NiFeMo so that the coercive force Hc of said magnetic material is in the range of Hc $\leq 1$ Oe.

(4) Moreover, the present invention is also characterized in that the composition ratio of NiFeMo is selected so that a specific resistance ρ is in the range of ρ $\geq 20$ μΩcm in any one of the above items (1) to (3).

As explained above, the magnetic material having the specific resistance higher than that of permalloy such as $Ni_{82}Fe_{18}$ or the like of the related art can be obtained by selecting the composition ratio of NiFeMo so that the specific resistance ρ is in the range of ρ $\geq 20$ μΩcm. Thereby, eddy current loss We can be reduced and limit frequency fg can be raised.

(5) Moreover, the present invention is characterized in that the composition ratio of NiFeMo is selected so that the saturated magnetic flux density Bs of said magnetic material is in the range of Bs $\geq 0.8$ T in any one of the above items (1) to (4).

As explained above, the saturated magnetic flux density almost identical to that of permalloy can be obtained by selecting the composition ratio of NiFeMo so that the saturated magnetic flux density Bs of said magnetic material is in the range of Bs $\geq 0.8$ T Therefore, the recording magnetic field intensity similar to that of permalloy can be attained.

(6) Moreover, the present invention is characterized in that the magnetic pole layer of the magnetic head can be formed using any magnetic material of the items (1) to (5). As explained above, the magnetic domain structure almost identical to the ideal one can be obtained in the area near the end part of the upper magnetic pole layer, particularly the upper magnetic pole layer using any magnetic material of items (1) to (5) and thereby an induction type thin film magnetic head or a composite type thin film magnetic head having excellent high frequency characteristic can be realized.

(7) Moreover, the present invention is characterized in forming a magnetic shield layer of a magnetic head with any magnetic material of those of items (1) to (4).

As explained above, good shield effect for high frequency magnetic field noise and drive magnetic field can be maintained in the excellent condition by structuring the magnetic shield layers holding the magnetic resistance effect element using any magnetic material among those of items (1) to (4). Thereby, the MR head for reproducing and a composite type thin film magnetic head having excellent high frequency characteristic can be realized.

(8) Moreover, the present invention is characterized by forming the magnetic shield layer using any magnetic material among those of items (1) to (4) in the magnetic apparatus.

As explained above, application of magnetic shield layer is never limited to the magnetic head and, for example, in the magnetism measuring apparatus, such magnetic shield layer can also be used as the magnetic shield layer for shielding the external magnetic field as the source of noise.

According to the present invention, since the composition ratio of the NiFeMo alloy is selected to the value which assures excellent high frequency characteristic and provides the magnetic strain constant λs assuring easy formation of excellent magnetic domain structure without requiring the heat treatment, value of specific resistance ρ can be enlarged without sacrifice of the other characteristics. Thereby, the high frequency characteristic can be improved to a large extent in view of improving the magnetic recording capability. As a result, the present invention can much contribute to high frequency.

In each of the accompanying drawings, each of numbered portions is as follows:
11 Upper magnetic pole layer;
12 Write pole;
13 Magnetic wall;
14 Hexagonal magnetic domain;
15 Triangular magnetic domain;
21 $Al_2O_3$-Tic substrate;
22 $Al_2O_3$ film;
23 Lower magnetic pole layer;
24 Write gap layer;
25 Lower interlayer insulating film;
26 Write coil;
27 Upper interlayer insulating film;
28 Upper magnetic pole layer;
29 Write pole;
30 Lower shield layer;
31 Lower read gap layer;
32 Magnetic resistance effect element;
33 Upper read gap layer;
41 Lower shield layer;
42 Magnetic resistance effect element;
43 Read electrode;
44 Lower magnetic pole layer;
45 Write coil;
46 Upper magnetic pole layer;
47 Upper magnetic pole layer;
48 Write pole;
49 Magnetic wall;
50 Hexagonal magnetic domain;
51 Triangular magnetic domain;

DETAILED DESCRIPTION OF THE PREFERRED EMBODIMENT

A thin film magnetic head of the preferred embodiment of the present invention will be explained below. First, dependence on the NiFeMo composition of various magnetic characteristics in the NiFeMo (Nickel-Iron-Molybdenum) alloy film will be explained with reference to FIG. 2 to FIG. 4.

Indicated as the first embodiment is the magnetic pole layer of a write head of the shape that the antenna-like portions which will become the write ports are added to the crest points of generally known pentagonal shape (home-base used in baseball) (a triangular shape is added to one side of the parallelogram such as square or the like).

Electrolytic plating method which is used for the method to manufacture an ordinary magnetic pole layer. Thickness of this film is set to 1 to 3 μm and only the magnetic field of 400 [Oe] is applied during film formation but particular processes are never executed. Details of composition ratio of chemicals used and method of forming a film are described in the Japanese Published Unexamined Patent Application No. HEI 10-220011. In summary, the NiFeMo (Nickel-Iron- Molybdenum) alloy film is formed by the electric plating method, for example, using the plating bath including Ni ion, Fe ion, Mo ion, hydroxy calboxylic acid or an organic acid which is the salt of hydroxy calbocylic acid. In this case, concentration of the organic acid in the plating bath shall be 0.001 mol/l or more which is 3 to 20 times the concentration of Mo ion in the plating bath.

Figure 2A:
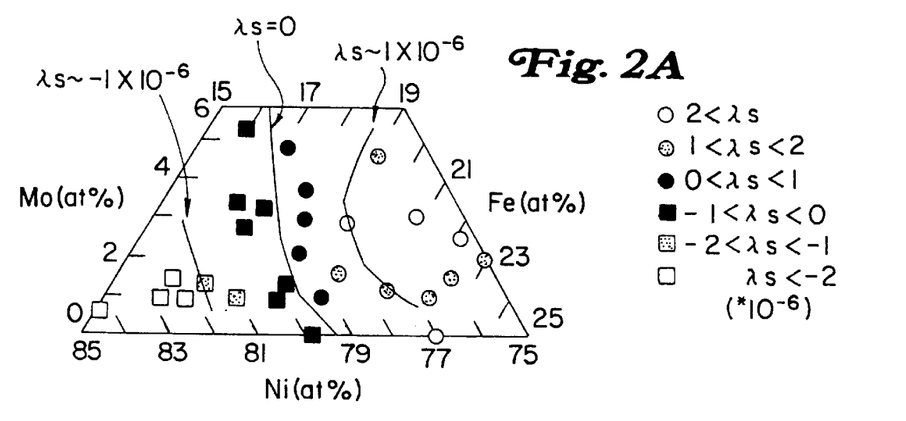
FIGS. 2A–2C are diagrams for explaining the dependence on NiFeMo composition of the magnetic strain constant λs and magnetic domain structure.

FIG. 2(a) illustrates the measurement result of dependence on the NiFeMo composition of magnetic strain constant λs and an optical lever method has been used for measurement of magnetic strain constant λs.

As is apparent from the figure, the more the Ni composition ratio increases or the more the Mo composition ratio decreases, the more the magnetic strain constant λs becomes lower. When the Ni composition ratio is near to about 80 atom % (at %), X s=0 is obtained and when the Ni composition ratio becomes larger than above value, the magnetic strain constant λs becomes negative and moreover when the Ni composition ratio becomes smaller than the above value, the magnetic strain constant λs becomes positive.

Figure 2B:
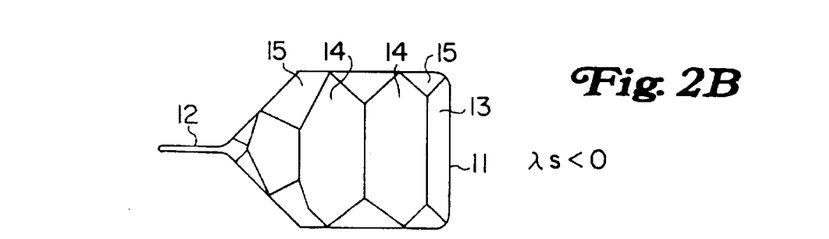

FIG. 2(b) illustrates the magnetic domain structure when the upper magnetic pole layer 11 is formed by the NiFeMo alloy film where λs is almost equal to zero or negative value and Mo composition ratio is about 2.0 atom %. In this case, the bitter method for collecting colloid of iron oxide at the magnetic wall 13 at the boundary of magnetic domain is used and the result thereof obtained using microscope is copied. As is apparent from the figure, the hexagonal magnetic domain 14 is formed up to the area near the write pole 12 and it has also been observed that such magnetic domain structure is similar to the ideal one even when he particular heat treatment is never executed.

Figure 2C:
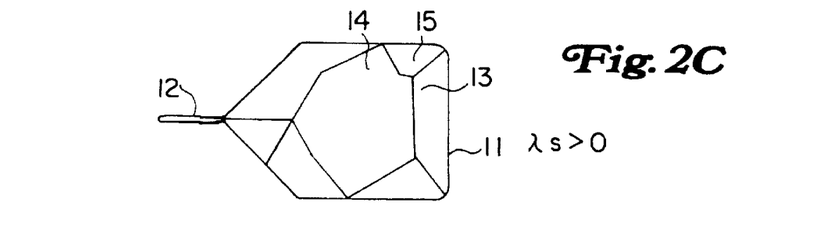

FIG. 2(c) illustrates the magnetic domain structure when the upper magnetic pole layer 11 is formed by the NiFeMo alloy film where λs is almost equal to zero or positive value and Mo composition ratio is about 2.5 atom % and the result by the bitter method using the microscope is copied. As is apparent from the figure, it is observed that the total hexagonal magnetic domain area 14 is rather small and greater magnetic domain is formed by the triangular magnetic domain 15 and it is not the preferable magnetic domain.

Therefore, the composition ratio giving the magnetic strain constant λs in the range of λs≦0 must be selected to form the upper magnetic pole layer having good magnetic domain structure without executing particular heat treatment for the magnetic domain control. Moreover, when the magnetic strain constant λs is negative, good magnetic domain cannot be obtained if the absolute value thereof is large. Accordingly, it is requested to select the composition ratio of NiFeMo to satisfy the condition, λs≧−1×10$^{-6}$, namely the total condition, −1×10$^{-6}$≦λs≦0.

Figure 3A:
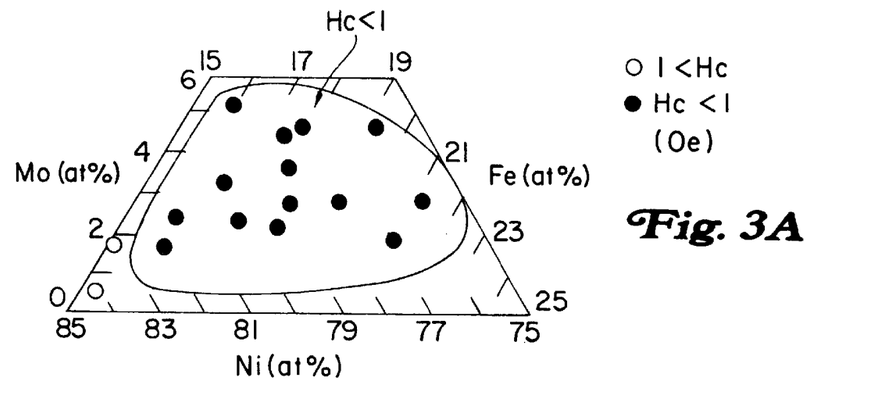
FIGS. 3A and 3B are diagrams for explaining the dependence on NiFeMo composition of the coercive force Hc and specific resistance ρ.

FIG. 3(a) illustrates the measurement result of dependence on NiFeMo composition of coercive force Hc. At the time of measuring coercive force Hc, the VSM (Vibrating Sample Magnetometer) method has been introduced.

As is obvious from the figure, since Hc<1 [Oe] in the range enclosed by the solid line, following conditions are required to obtain the magnetic film satisfying the condition Hc≦1 [Oe]:

75 at %≦Ni composition ratio≦83at %

15 at %≦Fe composition ratio≦22at %

0 at %<Mo composition ratio≦6at %.

Figure 3B:
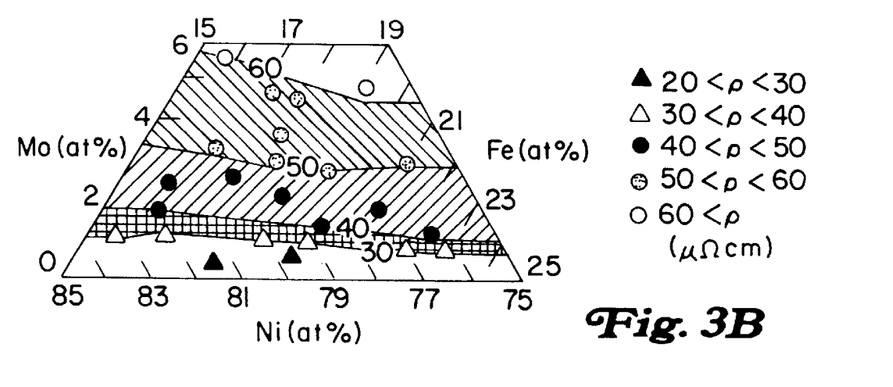

Referring to FIG. 3(b):

FIG. 3(b) illustrates the measurement result of dependence on NiFeMo composition of specific resistance ρ. For the measurement of specific resistance ρ, the four terminal method is used.

As is obvious from the figure, specific resistance ρ increases with increase of Mo composition ratio but in the range illustrated in the figure, the specific resistance ρ is in the range of ρ≧20 μΩcm and it has been confirmed that such specific resistance can be made higher than that of permalloy.

Figure 4A:
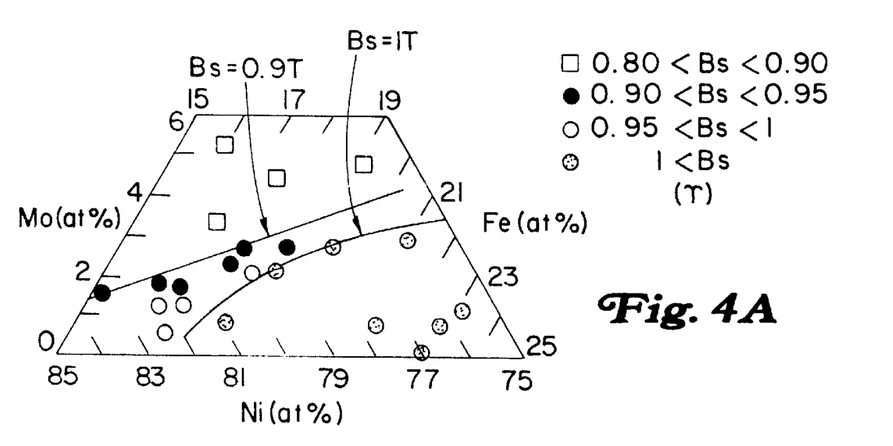
FIGS. 4A and 4B are diagrams for explaining the dependence on NiFeMo composition of the saturated magnetic flux Bs and permeability characteristic.

FIG. 4 illustrates the measurement result of dependence on NiFeMo composition of ρ of the saturated magnetic flux density Bs. For the measurement of saturated magnetic flux density Bs, VSM method has been used as in the case of the measurement of coercive force Hc.

As is obvious from the figure, the saturated magnetic flux density Bs tends to increase with increase of Fe composition ratio and also tends to decrease with increase of Ni composition rate. But, in the range illustrated in the figure, Bs is equal to or larger than 0.8 T (Bs≧0.8 T) and it has been confirmed that the saturated magnetic flux density Bs similar to that of permalloy can be obtained.

Figure 4B:
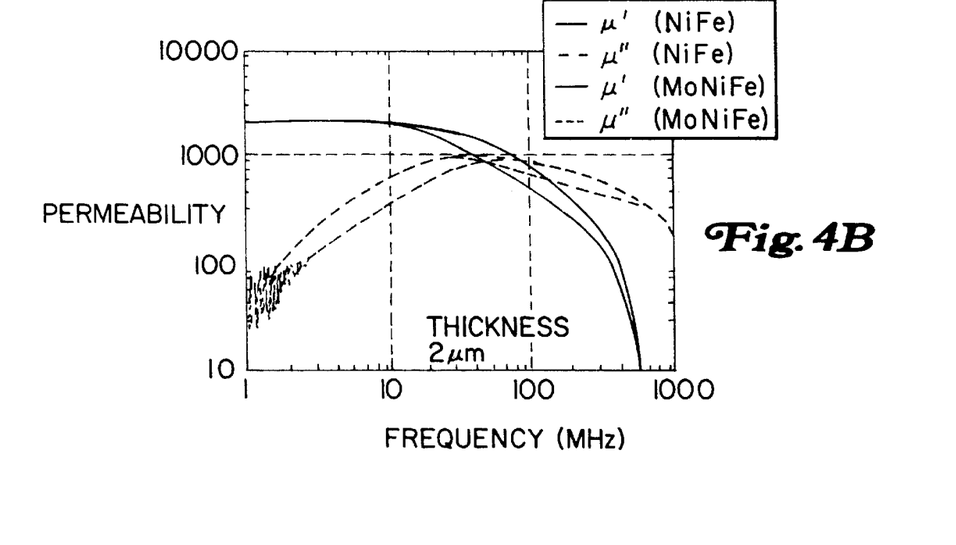

FIG. 4(b) illustrates the measurement result of permeability when the $Ni_{80}Fe_{17.5}Mo_{2.5}$ under the condition of the magnetic strain constant λs=−5×10−7, coercive force Hc=0.5 Oe, specific resistance ρ=47 μΩcm and saturated magnetic flux density Bs=0.95 T and the permalloy $Ni_{80}Fe_{20}$ are laminated as a film in the thickness of 2 μm.

As is obvious from the figure, if the frequency exceeds about 20 MHz, the effective permeability of $Ni_{80}Fe_{20}$ starts to become smaller than that of $Ni_{80}Fe_{17.5}Mo_{2.5}$ and when the frequency exceeds about 40 MHz, such effective permeability μ' becomes less than 1000. In the case of $Ni_{80}Fe_{17.5}Mo_{2.5}$, the effective permeability μ' exceeds 1000 in the frequency up to about 70 MHz and thereby improvement of permeability in the frequency up to 100 NHz band has been confirmed.

Here, μ" is non-effective permeability.

In summary, in order to form the magnetic film having the good high frequency characteristic with the NiFeMo alloy film, the NiFeMo composition ratio must be set in the following conditions.

75 at %≦Ni composition ratio≦83 at %

15 at %≦Fe composition ratio≦22 at %

0 at %<Mo composition ratio≦5 at %

When safety is further considered, following conditions are preferable.

77 at %≦Ni composition ratio≦82 at %

15 at %≦Fe composition ratio≦21 at %

0 at %<Mo composition ratio≦6 at %

Moreover, in the range of composition ratio, in order to obtain the magnetic domain structure similar to the ideal one, the magnetic strain constant λs must be set in the following condition as is obvious from the figure.

−1×10$^{-6}$≦λs≦0

Moreover, in addition to such conditions, it is preferable to select the composition ratio of NiFeMo to satisfy at least one condition among those indicated below in regard to the coercive force Hc, specific resistance ρ, and saturated magnetic flux density Bs in order to surely obtain the excellent high frequency characteristic.

$Hc \leq 1 [Oe]$ $\rho \geq 20 \ \mu\Omega cm$ $Bs \geq 0.8 \ T$

Figure 5A:
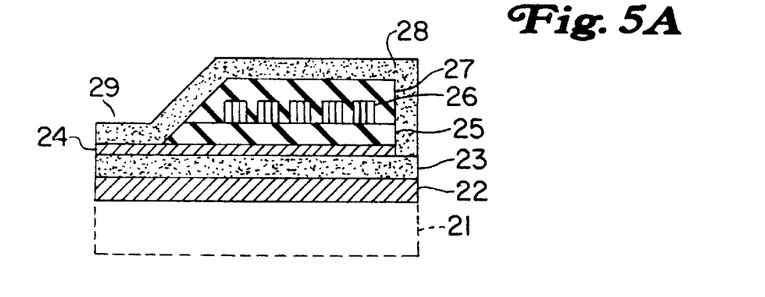
FIGS. 5A and 5B are sectional views of a thin film magnetic head of an embodiment of the present invention.
Figure 5B:
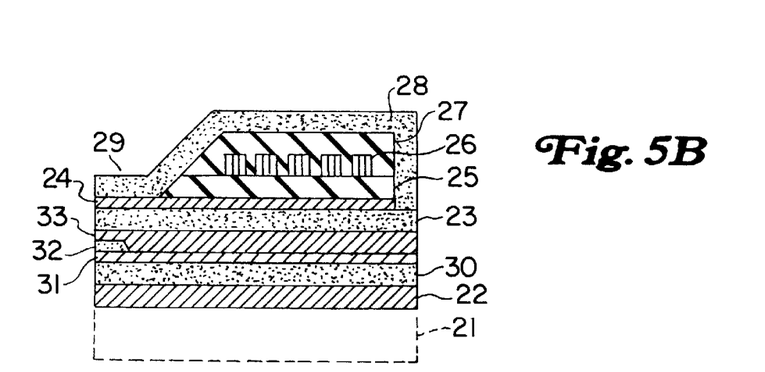

Next, the first and second embodiments of the present invention in relation to the practical structure of the thin film magnetic head or composite type thin film magnetic head utilizing the NiFeMo alloy film of the composition ratio in the range explained above will be explained with reference to FIG. 5.

In this case, any kind of magnetic material film of which composition rate satisfies the above conditions may be used but here $Ni_{80}Fe_{17.5}Mo_{2.5}$ which has been used for measurement of permeability in FIG. 4(b) is also used.

Therefore, in this case, magnetic strain constant λs, coercive force Hc, specific resistance ρ and saturated magnetic flux Bs of the magnetic material film are set as follows as explained above.

$\lambda s = -5 \times 10-7$, $Hc=0.5$ Oe, $\rho=47 \ \mu\Omega cm$ and $Bs=0.95$ T.

FIG. 5(a) is a schematic cross-sectional view of the essential portion an induction type thin film magnetic head of the first embodiment of the present invention. First, after the Ta layer in the thickness of 50 to 100 Å, for example, 50 Å and a plating base layer (not illustrated) consisting of NiFe alloy in the thickness of 1000 Å or less, for example, 500 Å are formed via the $Al_2O_3$ film 22 on the $Al_2O_3$-TiC substrate 21 as the mother material of slider, the resist film is coated accompanied by the patterning to form the resist mask (not illustrated) having the predetermined aperture. Thereafter, the lower magnetic pole layer 23 consisting of $Ni_{80}Fe_{17.5}Mo_{2.5}$ alloy in the thickness of 2.5 to 4.0 μm, for example, 3.0 μm is formed by the electrolytic plating method, the resist mask is removed and then exposed area of the plating base layer is removed by the ion milling method using the Ar ion.

Next, $Al_2O_3$ is deposited in the thickness of 0.2 to 0.6 μm, for example, 0.4 μm by the sputtering method as the write gap layer 24. Thereafter, the Cu film is provided in the thickness of 2.5 to 4.0 μm, for example, 3.0 μm via the lower interlayer insulating film 25 consisting of resist in the thickness of 3.0 to 4.0 μm, for example, 3.5 μm and it is then patterned to form the flat spiral write coil 26 wound for several turns around the upper magnetic pole layer 28 and lower magnetic pole layer 23 which will be formed later and the write electrodes provided at both ends of such write coil. Thereafter, the upper interlayer insulating film 27 consisting of resist in the thickness of 3.0 to 4.0 μm, for example, 3.5 μm is formed again to cover the write coil 26.

In this case, the thickness of the write gap layer 24 becomes an interval of magnetic gaps, namely the gap length.

Next, the Ti layer in the thickness of 50 to 100 Å, for example 50 Å and the NiFe film in the thickness of 1000 Å or less, for example, 500 Å are sequentially formed by the sputtering method to form the plating base layer (not illustrated). Next, the resist layer is coated and it is then exposed and developed to provide the resist mask (not illustrated) having an aperture of the shape corresponding to the upper magnetic pole layer 28. Using this resist mask as the mask, the upper magnetic pole layer 28 which is composed of $Ni_{80}Fe_{17.5}Mo_{2.5}$ alloy in the thickness of 2.0 to 4.0 μm, for example, 3.0 μm is formed by the electrolytic plating method. In this case, the end part of this upper magnetic pole layer 28 becomes the narrow write pole 29.

Next, after the resist mask is removed, the exposed area of the plating base layer is removed by ion milling using the Ar ion. Next, the $Al_2O_3$ film is provided to the entire surface as the protection film (not illustrated) and the substrate is cut and the slider process including the machining and grinding for adjusting length of the write pole 29, namely gap depth is also conducted to complete a high recording density induction type thin film magnetic head having excellent high frequency characteristic.

In this first embodiment, since the $Ni_{80}Fe_{17.5}Mo_{2.5}$ alloy is used as the lower magnetic pole layer 23 and the upper magnetic pole layer 28, the thin film magnetic head having excellent high frequency characteristic can be formed and in the upper magnetic pole layer 28, the magnetic domain structure which is similar to the ideal one in which the hexagonal magnetic domain is formed up to the area near the write pole 29 can be realized.

FIG. 5(b) is a schematic cross-sectional view of the essential portion of a composite type thin film magnetic head of the second embodiment of the present invention. First, the lower shield layer 30 consisting of $Ni_{80}Fe_{17.5}Mo_{2.5}$ alloy in the thickness of 2.0 to 4.0 μm, for example, 3.0 μcm is provided via the $Al_2O_3$ film 22 on the $Al_2O_3$-TiC substrate 21 which becomes the mother material of slider and the magnetic resistance effect element 32 consisting of the laminated structure of NiFe, Ti, NiFeCr is also provided via the lower lead gap layer 31 consisting of $Al_2O_3$. Thereafter, these are patterned to the predetermined shape. Next, a lead electrode (not illustrated) is formed by depositing a conductive film consisting of Au or the like to both ends of the magnetic resistance effect element 32 and the upper lead gap layer 33 consisting of $Al_2O_3$ is provided again.

Thereafter, in the same manner as the first embodiment, after the Ta layer in the thickness of 50 to 100 Å, for example, 50 Å and a plating base layer (not illustrated) consisting of NiFe alloy in the thickness of 1000 Å or less, for example, 500 Å are formed on the upper lead gap layer 32, the resist film is coated accompanied by the patterning to form the resist mask (not illustrated) having the predetermined aperture. Thereafter, the lower magnetic pole layer 23, which also working as the upper shield layer, consisting of $Ni_{80}Fe_{17.5}Mo_{2.5}$ alloy in the thickness of 2.5 to 4.0 μm, for example, 30 μm is formed by the electrolytic plating method, the resist mask is removed and then exposed area of the plating base layer is removed by the ion milling method using the Ar ion.

Next, $Al_2O_3$ is deposited in the thickness of 0.2 to 0.6 μm, for example, 0.4 μm by the sputtering method as the write gap layer 24. Thereafter, the Cu film is provided in the thickness of 2.5 to 4.0 μm, for example, 3.0 μm via the lower interlayer insulating film 25 consisting of resist in the thickness of 3.0 to 4.0 μm, for example, 3.5 μm and it is then patterned to form the flat spiral write coil 26 wound for several turns around the upper magnetic pole layer 28 and lower magnetic pole layer 23 which will be formed later and the write electrodes provided at both ends of such write coil. Thereafter, the upper interlayer insulating film 27 consisting of resist in the thickness of 3.0 to 4.0 μm, for example, 3.5 μm is formed again to cover the write coil 26.

Next, the Ti layer in the thickness of 50 to 100 Å, for example 50 Å and the NiFe film in the thickness of 1000 Å or less, for example, 500 Å are sequentially formed by the sputtering method to form the plating base layer (not illustrated). Next, the resist layer is coated and it is then exposed and developed to provide the resist mask (not illustrated) having an aperture of the shape corresponding to the upper magnetic pole layer. Using this resist mask as the mask, the upper magnetic pole layer 28 which is composed of $Ni_{80}Fe_{17.5}Mo_{2.5}$ alloy in the thickness of 2.0 to 4.0 μm, for example, 3.0 μm is formed by the electrolytic plating method. In this case, the end part of this upper magnetic pole layer 28 becomes the narrow write pole 29.

Next, after the resist mask is removed, the exposed area of the plating base layer is removed by ion milling using the Ar ion. Next, the $Al_2O_3$ film is provided to the entire surface as the protection film (not illustrated) and the substrate is cut and the slider process including the machining and grinding for adjusting length of the write pole 29, namely gap depth is also conducted to complete a high recording density induction type thin film magnetic head having excellent high frequency characteristic.

In this second embodiment, since the magnetic resistance effect element 32 forming the MR head for reproducing is held by the lower shield layer 31 consisting of the $Ni_{80}Fe_{17.5}Mo_{2.5}$ alloy and the lower magnetic pole layer 23 which becomes the upper shield layer, excellent shield effect for high frequency magnetic field noise around 100 MHz and drive magnetic field can be attained and thereby high reproducing resolution can be expected.

In this case, since the upper magnetic pole layer 28 is also formed of the $Ni_{80}Fe_{17.5}Mo_{2.5}$ alloy, the magnetic domain structure similar to the ideal one in which the hexagonal magnetic domain is formed up to the area near the write pole 29 can be realized without executing particular heat treatment. Thereby, since the heat treatment after formations of the magnetic resistance effect element 32 is no longer required, high frequency recording can be realized while maintaining higher reproducing output without giving any adverse effect to the magnetic resistance effect element 32 forming the MR head for reproducing.

Explained next is the case where the flat shape of the magnetic pole layer of write head is replaced with the shape having a tensile stress, in place of the generally known shape having a compressed stress as indicated in the first embodiment.

In the case where the magnetic pole layer having a tensile stress is briefly indicated, it is enough to form a large aperture within the pentagon explained in the first embodiment. For the detail explanation, the principle is first explained.

In view of forming a magnetic head having excellent characteristics by forming the circulating magnetic domain structure up to the end part of the write pole, it is required to consider the anisotropy generated in the magnetic pole length direction with elastic magnetic anisotropic energy. When magnetic strain is λ, tensile force is ρ, an angle formed by self-magnetization and tensile force ρ is θ, the elastic magnetic anisotropic energy E is expressed by the following formula.

$$E = -(3/2)\lambda\sigma \cos^2\theta$$

A certain magnetic head material has positive or negative magnetic strain and as a tensile stress as the tension (σ>0). Since the elastic magnetic anisotropy is generated to minimize the value E, θ=90° for λ<0, and θ=0 for λ>0. Namely, when λ<0, anisotropy is generated in the right angle direction to σ and when λ>0, anisotropy is generated in the same direction to σ.

Moreover, the direction of tensile stress is different depending on the shape of magnetic pole. Namely, the tensile force works in the direction of magnetic pole length (y direction) for the longer shape of magnetic pole and in the direction of magnetic pole width (x direction) for the wider shape thereof. It is because the tensile stress is applied in the relatively longer direction when the length is compared with the width from viewpoint of the shape. As is obvious from the above formula, when a material having positive magnetic strain and tensile stress is used, it is requested to set the shape of magnetic pole to satisfy the condition x>y. When the condition x>y is satisfied by the employment of short yoke, on the contrary, it is requested to use the material having positive magnetic strain. In this case, the circulating magnetic domain structure is formed up to the end part of magnetic pole and thereby the magnetic head having excellent characteristics can be formed.

On the other hand, when it is requested to change the material to have a tensile stress without largely changing the process to form an ordinary pentagon write head in which the magnetic pole layer has a compressed stress, it is enough to provide a hollow portion at the center of magnetic pole layer.

Figure 8:
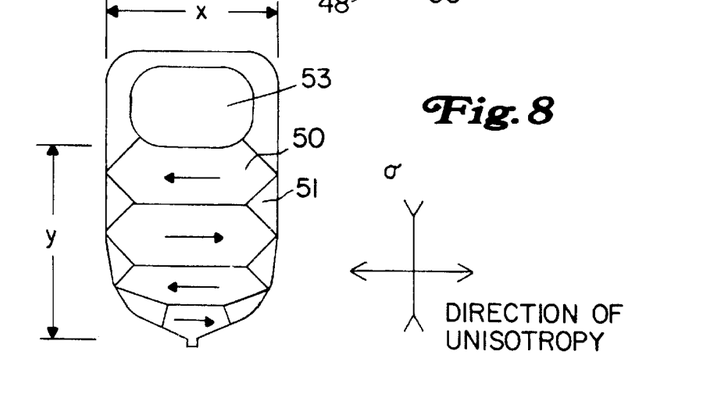
FIG. 8 is a schematic plan view of ideal magnetic domain structure in relation to the second embodiment of the present invention.

FIG. 8 is a schematic plan view of the ideal magnetic domain structure of the second embodiment of the present invention. This figure illustrates the ideal magnetic domain structure model of the magnetic pole layer of write head including the tensile stress by providing the follow portion. In the case of the magnetic pole layer illustrated in this figure, outline is basically based on the shape of the first embodiment but a hollow portion (back gap) is provided at the inside of magnetic layer material and thereby a tensile stress is generated therein. In this magnetic pole layer, the circulating magnetic domain structure consisting of the hexagonal magnetic domain and triangular magnetic domain is formed toward the end part of the magnetic pole located at the lower direction on the figure in the magnetic pole layer from the back gap, but propagation of magnetic flux contributing to recording and reproducing operation through rotation of spin in the hexagonal magnetic domain can be realized with high speed and good reproducibility up to the end part of the magnetic pole from the back gap by forming such hexagonal magnetic domain up to the end part.

Figure 9A:
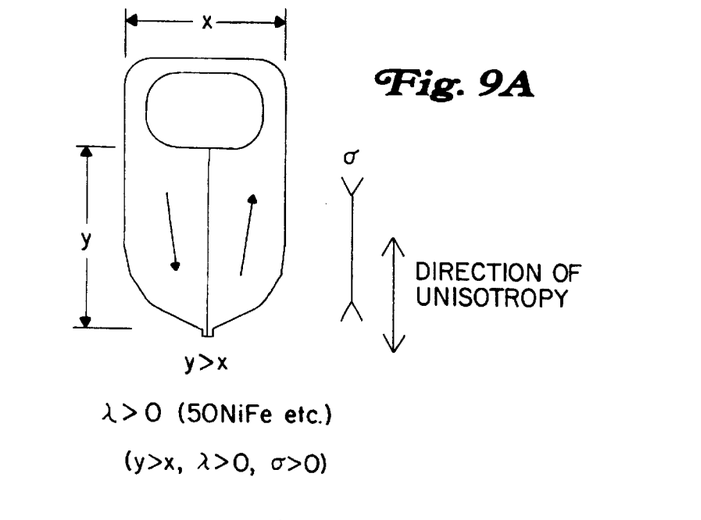
FIGS. 9A and 9B are plan views of observation images of the magnetic domain structure in relation to the second embodiment of the present invention.
Figure 9B:
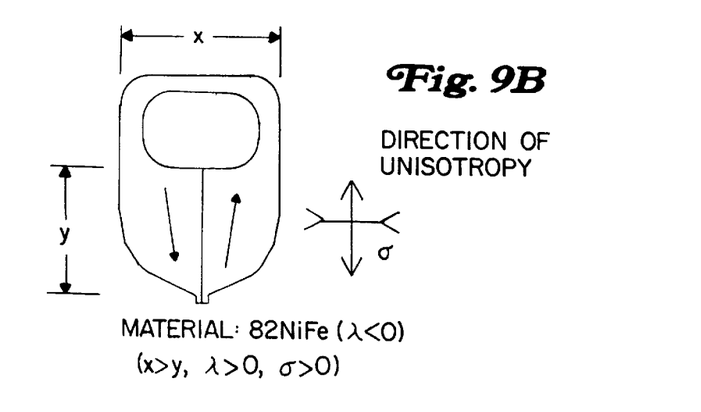

In the example of FIG. 8, the tensile stress σ is generated in the direction toward the end part of magnetic pole from the back gap, but it may also be generated in the direction orthogonal to the direction toward the end part of magnetic pole from the back gap by adjusting the lateral width of magnetic pole layer and length in the vertical direction (length in the direction extending to the end part of the magnetic pole from the back gap). Therefore, this process will be explained below with reference to FIG. 9.

Figure 10:
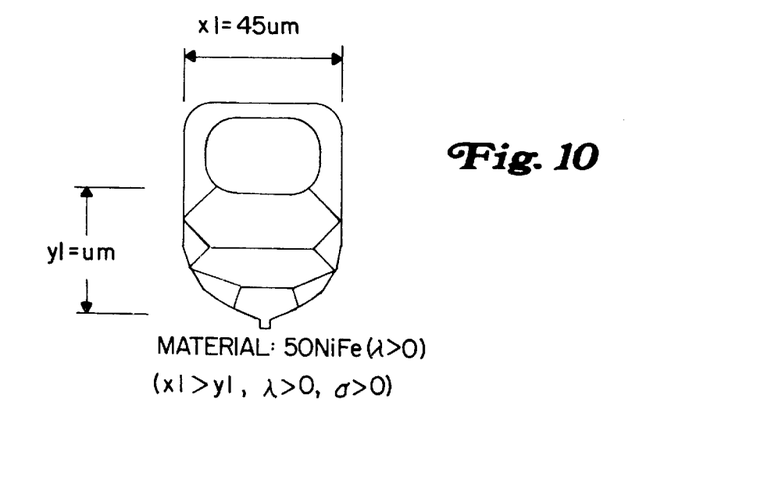
FIG. 10 is a schematic plan view of magnetic pole layer of write head in relation to the second embodiment of the present invention.

FIGS. 9(A), 9(B) are schematic plan views of examples of observation of magnetic domain structure of the second embodiment of the present invention. In the FIG. 9(A), lateral width x is shorter than the vertical length y, namely, width of magnetic pole is shorter than the length of magnetic pole. On the other hand, in FIG. 9(B), the lateral width x is longer than the vertical length y, namely width of magnetic pole is longer than the length of magnetic pole. In general, the tensile stress works relatively in the longer side when length of magnetic pole is compared with width thereof but result of observation for magnetic domain through the Karr microscope has proved above explanation. Namely, observation through the Karr microscope has proved that in the case of FIG. 9 (A), the tensile stress σ is generated in the length direction of magnetic pole, while in the case of FIG. 9 (B), it is generated in the width direction of magnetic pole. FIG. 10 is a schematic plan view of the magnetic pole layer of write head based on the second embodiment of the present invention. The magnetic pole layer of write head is used under the condition that the width of magnetic pole is 45 μm, length of magnetic pole is 35 μm and magnetic pole layer material is formed of 50 NiFe (positive magnetic strain).

Figure 11A:
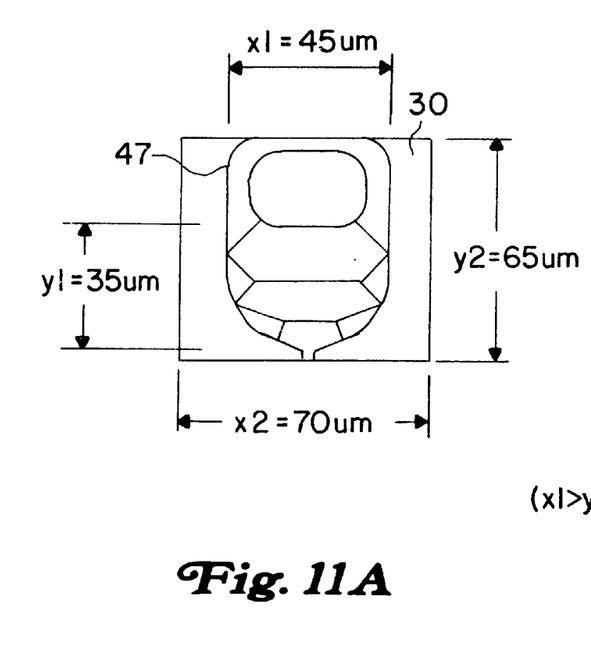
FIGS. 11A–11C are diagrams illustrating an application example of a composite type magnetic head in relation to the second embodiment of the present invention (schematic plan view (11A), plan view of the magnetic domain structure model (11B), cross-sectional structure from the end of the magnetic pole (11C)).
Figure 11B:
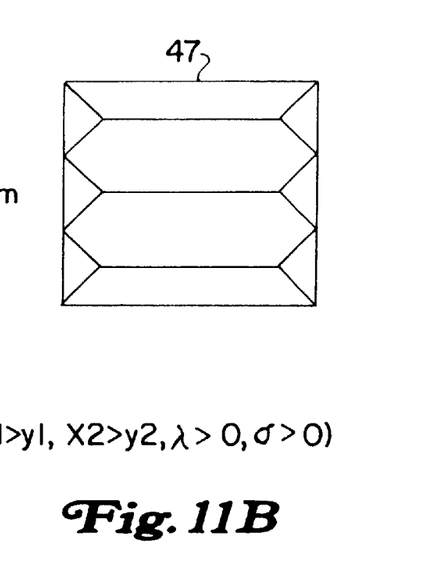
Figure 11C:
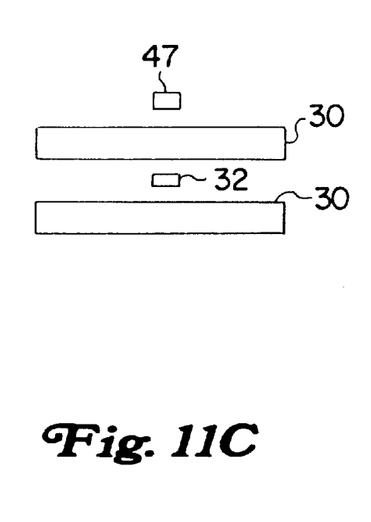

Next, an embodiment when the magnetic pole layer of write head illustrated in FIG. 10 is used as a part of an ordinary composite type MR head will be explained with reference to FIGS. 11(a)–11(c). FIGS. 11(a)–11(c) are schematic diagrams illustrating the application examples of composite type magnetic disk based on the second embodiments of the present invention. An ordinary cross-sectional view of the composite type magnetic head integrating the read head and write head can schematically be illustrated as FIG. 11(c). An MR element for read operation is provided and a magnetic shield layer is provided in both sides of the MR element in view of eliminating influence of magnetism in the surrounding which prevents reading of magnetically recorded information recorded in a magnetic recording medium. In addition, at the external side of the three-layer structure of this magnetic shield layer/MR element/magnetic shield layer, the upper magnetic pole is provided for write operation. Structure of the upper magnetic pole is shaped as illustrated in FIG. 10. The plan view of the composite type magnetic head from the upper direction is illustrated in FIG. 11(a). In FIG. 11(a), the magnetic shield layer is provided under the upper magnetic pole illustrated in FIG. 10. In this case, however, the magnetic shield layer is sufficiently larger than the upper magnetic pole. While the width of upper magnetic pole is 45 µm, width of the magnetic shield layer is 70 µm and while length of the upper magnetic pole is 35 µm, length of the magnetic shield layer is 65 µm. When the magnetic shield layer is patterned to a rectangular shape, the magnetic domain structure model thereof is formed through combination of the simple hexagonal magnetic domain and triangular magnetic domain as illustrated in FIG. 11(b).

Next, in the case where the composite type magnetic head illustrated in FIG. 11 is applied to the practical structure of the thin film magnetic head or composite type thin film magnetic head using the NiFeMo alloy film of the composition ratio in the range explained above, it is requested to introduce the structure illustrated in FIG. 5 conforming to the explanation about the first embodiment. Therefore, repeated explanation of the processes of FIG. 5 is avoided. In this case, any kind of material having the composition satisfying various conditions explained above may be used as the magnetic material film. Here, the material $Ni_{80}Fe_{17.5}Mo_{2.5}$ alloy used for measurement of permeability illustrated in FIG. 4(b) is used. In this case, the magnetic strain constant of magnetic material film λs, coercive force Hc, specific resistance ρ, and saturated magnetic flux density Bs are determined as follow.

$\lambda s = +5 \times 10-7$, $Hc=0.5$ Oe, $\rho=47$ µΩcm, $Bs=0.95$ T

In another embodiment, since the magnetic resistance effect element 32 structuring MR head for reproducing is sandwiched by the lower shield layer 31 consisting of $Ni_{80}Fe_{17.5}Mo_{2.5}$ alloy and the lower magnetic pole layer 23 as the upper shield layer, excellent shield effect can be realized for magnetic field noise of the frequency as high as 100 NHz and drive magnetic field and thereby higher reproducing resolution can be expected.

In this case, since the upper magnetic pole layer 28 is structured also using the $Ni_{80}Fe_{17.5}Mo_{2.5}$ alloy, the magnetic domain structure similar to the ideal one in which the hexagonal magnetic domain is formed up to the area near the write pole 29 can be realized without executing the particular heat treatment. Accordingly, since the heat treatment after formation of the magnetic resistance effect element 32 is no longer required, high frequency recording can be realized while maintaining higher reproducing output without providing adverse effect on the magnetic resistance effect element 32 forming the MR head for reproducing.

Respective embodiments of the present invention have been explained above, but the present invention is never limited thereto and allows various changes or modifications. For example, the magnetic material forming the upper magnetic pole layer or the like is never limited to the $Ni_{80}Fe_{17.5}Mo_{2.5}$ alloy and any type of the NiFeMo alloy, which is in the range of composition ratio explained above and satisfies the various conditions about magnetic strain constant λs, coercive force Hc, specific resistance ρ, and saturated magnetic flux density Bs, can be used.

Moreover, inexplanation of respective embodiments, an induction type thin film magnetic head or a composite type then film magnetic head are considered but such head is also applied to the individual MR head only for reproducing. As in the case of the comoposite type thin film magnetic head, the NiFeMo alloy satisfying various conditions explained above can be used as the upper and lower magnetic shield layers, Moreover, the similar effect can also be obtained by applying the present invention to the GMR (gigantic magnetic resistance effect) element and spin valve element in place of the existing MR element. In addition, the present invention provides more excellent effect to remarkably reduce heat treatment history in the write head forming process for the ferro-magnetic tunnel junction element. Particularly, in the spin valve element, one magnetic material film (free layer) among a couple of magnetic material films contributing to the magnetic resistance effect is capable of freely rotating the magnetizing direction by sensing the magnetic field, while the other magnetic material film (called as "fixed layer" or "pinned layer") is fixed in its magnetizing direction not to rotate for the magnetic field when anti-ferromagnetic material is placed near thereto. However, since the magnetizing direction is determined by the heat treatment when no magnetic field is given, unwanted heat treatment may deflect the magnetizing direction which is intrinsically required in the direction different from such intrinsic direction. Therefore, it is strongly requested that the heat treatment is preferably not included in the processes. When the present invention is applied to the spin valve element forming process, such unnecessary heat treatment is eliminated and the magnetizing direction is determined to the desired direction resulting in the effect that a fine spin valve element having higher reliability and yield can be obtained and application of the present invention to the spin valve element surely results in the particularly desirable effect.

Moreover, in each embodiment, the magnetic material used for magnetic head has been explained but it is never limited to the magnetic head and such material can be used as the magnetic shield material, for example, in the magnetism measuring apparatus or the like.

What is claimed is:

1. A magnetic material comprising:
   a composition of Ni, Fe and Mo, having a ratio of 77 to 82 atom % Ni, 15 to 21 atom % Fe, under 6 atom % Mo and a magnetic strain constant λs in the range of $-1 \times 10^{-6} \leq \lambda s \leq 0$.

2. The magnetic material as claimed in claim 1, wherein said composition ratio of NiFeMo is selected so that a coercive force Hc of said magnetic material is in a range of $Hc \leq 1Oe$.

3. The magnetic material as claimed in claim 1 or 2, wherein said composition ratio of NiFeMo is selected so that a specific resistance ρ is in the range of $\rho \geq 20$ µΩcm.

4. The magnetic material as claimed in claim 1 or 2 wherein said composition ratio of NiFeMo is selected so that a saturated magnetic flux density Bs of said magnetic material is in the range of $Bs \geq 0.8$ T.

5. A magnetic head comprising:
a magnetic pole layer formed of said magnetic material in a shape having a compressed stress as claimed in any one of claim 1 or 2.

6. A magnetic material comprising:
a composition of Ni, Fe and Mo, having ratio of 77 to 82 atom % Ni, 15 to 21 atom % Fe, under 6 atom % Mo and magnetic strain constant λs in the range of $0 \leq \lambda s \leq 1 \times 10^{-6}$.

7. The magnetic material as claimed in claim 6, wherein said composition ratio of NiFeMo is selected so that a coercive force Hc of said magnetic material is in a range of $Hc \leq 1$ Oe.

8. The magnetic material as claimed in claim 6 or 7, wherein said composition ratio of NiFeMo is selected so that the specific resistance ρ is in a range of $\rho \geq 20 \mu\Omega cm$.

9. The magnetic material as claimed in claim 6 or 7, wherein said composition ratio of NiFeMo is selected so that a saturated magnetic flux density Bs of said magnetic material is in a range of $Bs \geq 0.8$ T.

10. A magnetic head comprising:
a magnetic pole layer formed using said magnetic material claimed in claim 6 or 7, in a shape having a tensile stress.

11. A magnetic head comprising:
a magnetic shield layer formed using a magnetic material claimed in any one of claim 1, 2, 6 or 7.

12. Magnetic storage device comprising:
a magnetic head claimed in claim 5.

13. Magnetic storage device using a magnetic head claimed in claim 9.

14. Magnetic storage device using a magnetic head claimed in claim 11.

15. The magnetic material as claimed claim 3 wherein said composition ratio of NiFeMo is selected so that a saturated magnetic flux density Bs of said magnetic material is in the range of $Bs \geq 0.8$ T.

16. A magnetic head comprising:
a magnetic pole layer formed of said magnetic material in a shape having a compressed stress as claimed in claim 4.

17. A magnetic head comprising:
a magnetic pole layer formed of said magnetic material in a shape having a compressed stress as claimed in claim 3.

18. The magnetic material as claimed in claim 8 wherein said composition ratio of NiFeMo is selected so that a saturated magnetic flux density Bs of said magnetic material is in a range of $Bs \geq 0.8$ T.

19. A magnetic head comprising:
a magnetic pole layer formed using said magnetic material claimed in claim 8 in a shape having a tensile stress.

20. A magnetic head comprising:
a magnetic pole layer formed using said magnetic material claimed in claim 9 in a shape having a tensile stress.

21. A magnetic head comprising:
a magnetic shield layer formed using a magnetic material claimed in claim 3.

22. A magnetic head comprising:
a magnetic shield layer formed using a magnetic material claimed in claim 4.

23. A magnetic head comprising:
a magnetic shield layer formed using a magnetic material claimed in claim 8.

24. A magnetic head comprising:
a magnetic shield layer formed using a magnetic material claimed in claim 9.

* * * * *